(12) United States Patent
Tseng et al.

(10) Patent No.: US 10,852,722 B2
(45) Date of Patent: Dec. 1, 2020

(54) FOLLOWING OPERATION SYSTEM

(71) Applicant: Ching Meng, Taipei (TW)

(72) Inventors: Pai-Yu Tseng, Taipei (TW); Yi-Cheng Jiang, Taipei (TW)

(73) Assignee: Ching Meng, Taipei (TW)

( * ) Notice: Subject to any disclaimer, the term of this patent is extended or adjusted under 35 U.S.C. 154(b) by 36 days.

(21) Appl. No.: 16/374,380

(22) Filed: Apr. 3, 2019

(65) Prior Publication Data

US 2020/0319633 A1 Oct. 8, 2020

(51) Int. Cl.
*G05D 1/00* (2006.01)
*G05D 1/02* (2020.01)
*A63B 55/60* (2015.01)

(52) U.S. Cl.
CPC ......... *G05D 1/0022* (2013.01); *G05D 1/0223* (2013.01); *A63B 55/61* (2015.10); *A63B 2225/50* (2013.01); *G05D 2201/0204* (2013.01)

(58) Field of Classification Search
CPC ............... G05D 1/0022; G05D 1/0223; G05D 2201/0204; A63B 55/61; A63B 2225/50
See application file for complete search history.

(56) References Cited

U.S. PATENT DOCUMENTS

| | | | | |
|---|---|---|---|---|
| 3,812,929 A * | 5/1974 | Farque | ................ | G05D 1/028 180/167 |
| 4,844,493 A * | 7/1989 | Kramer | ................ | B60K 1/02 180/169 |
| 4,926,161 A * | 5/1990 | Cupp | ................ | G08B 25/10 180/167 |
| 5,167,389 A * | 12/1992 | Reimers | ................ | B62B 1/042 248/96 |
| 5,180,023 A * | 1/1993 | Reimers | ................ | A63B 55/61 180/19.1 |
| 5,517,098 A * | 5/1996 | Dong | ................ | G05D 1/0234 318/581 |
| 5,711,388 A * | 1/1998 | Davies | ................ | A63B 69/36 180/168 |
| 5,810,105 A * | 9/1998 | Trainer | ................ | G05D 1/0255 180/169 |
| 5,944,132 A * | 8/1999 | Davies | ................ | A63B 57/00 180/168 |
| 6,327,219 B1 * | 12/2001 | Zhang | ................ | G01S 15/86 367/128 |

(Continued)

*Primary Examiner* — Babar Sarwar
(74) *Attorney, Agent, or Firm* — Muncy, Geissler, Olds & Lowe, P.C.

(57) ABSTRACT

A following operation system includes a target device and a vehicle body. A control module of the vehicle body is connected with the target device and sends out a first signal. The control module controls the vehicle body to move in a manual or following mode according to a switch signal from the target device. In the manual mode, the user imposes an external force to move the vehicle body. In the following mode, the control module generates a movement signal according to the signal sent back by the target device, whereby vehicle body follows the target device according to the movement signal. When the target device leaves the communication range of the control module, the control module stops the vehicle body and sends out a reminder signal. Therefore, the movement method of the vehicle body is adjustable, and a reminder function is provided.

9 Claims, 7 Drawing Sheets

(56) References Cited

U.S. PATENT DOCUMENTS

| | | | | |
|---|---|---|---|---|
| 6,404,159 | B1* | 6/2002 | Cavallini | B60L 50/60 318/587 |
| 6,934,625 | B2* | 8/2005 | Haddad | G08G 1/20 342/357.31 |
| 8,789,638 | B2* | 7/2014 | Zhang | G05D 1/0255 180/167 |
| 8,886,383 | B2* | 11/2014 | Hyde | A61G 7/0527 701/24 |
| 2004/0199292 | A1* | 10/2004 | Sakagami | G05D 1/0274 700/259 |
| 2014/0196967 | A1* | 7/2014 | Chang | G05D 1/0255 180/167 |
| 2016/0023675 | A1* | 1/2016 | Hannah | G07C 5/085 701/2 |
| 2017/0050659 | A1* | 2/2017 | Cardano | B62D 5/046 |
| 2018/0208226 | A1* | 7/2018 | Tse | B62B 5/0053 |
| 2019/0155278 | A1* | 5/2019 | Idbrant | E02F 9/205 |
| 2020/0209895 | A1* | 7/2020 | Wang | G05D 1/1064 |

\* cited by examiner

FOLLOWING OPERATION SYSTEM

BACKGROUND OF THE INVENTION

1. Field of the Invention

The present invention relates to operation systems, and more particularly, to a following operation system, wherein the vehicle movement method varies according to different ground conditions, and a reminder is immediately generated when the target device leaves the communication range of the vehicle body.

2. Description of the Related Art

An automatic following system of a movable vehicle has been applied in the golf course, such that the movable vehicle carries golf clubs and automatically follows the golf player. A conventional automatic following system provides real time coordinates of the golf player to the movable vehicle through the global positioning system (GPS), such that the movable vehicle is navigated to the golf player. However, the real time coordinates of the golf player are not precisely positioned, thus failing to achieve an accurate following effect.

For improving the unprecise positioning issue of the prior art, in the disclosure of US20040199292A1, a camera device is installed on a movable vehicle, so as to follow an athlete by use of image determination function. However, the image applying method requires a large amount of time for processing and calculating the image features, resulting a certain delay during the following process. Also, upon the camera device failing to capture the image features of the athlete, the image determination process is unable to be carried out, failing to achieve the following function.

In addition, in the disclosure of U.S. Pat. No. 6,327,219B1, a guide device is worn on an athlete, with the movable vehicle provided with a following device. The guide device and the following device determines the relative positions of the athlete and the movable vehicle by use of ultrasonic wave signal, achieving a following function. However, ultrasonic wave signal is directionally transmitted. Therefore, the athlete must remain in front of the movable vehicle for maintaining the following effect. Upon the athlete moving away from the frontal region of the movable vehicle, the relative positions is unable to be determined, failing to achieve the following effect.

Regarding the aforementioned prior arts, if the GPS is unable to receive the position of the athlete, of if the camera device fails to capture the image of the athlete, or if the guide device being disconnected from the following device, the movable vehicle is unable to follow the athlete. Under such situations, if the athlete keeps moving without awareness of such disconnection, the distance between the movable vehicle and the athlete will increase, and then the athlete has to turn back for searching the movable vehicle once being aware of the disconnection, failing to meet the convenience of usage.

Also, heights of the ground in the golf course greatly changes. While the movement of the movable vehicle is usually controlled by electrical power. Because the strength of the electrical power has a certain limitation, on a ground with greatly inconsistent heights, the movement of the movable vehicle is easily hindered by the inclination angle with respect to the ground, or the movable vehicle will suffer from damage due to toppling.

SUMMARY OF THE INVENTION

For improving the issues above, a following operation system is disclosed, which is able to adjust the movement manner according to different ground conditions, and immediately generate a reminder when the target device leaves the detection range of the vehicle body.

For achieving the aforementioned objectives, a following operation system in accordance with an embodiment comprises:

a target device having a target module and a remote control module, the remote control module setting and outputting a switch signal; and a vehicle body having a holder, a driving module, and a control module, the holder applied for holding objects, the driving module connected with the holder, the control module signally connected with the target device and sending a first signal, and the control module controlling the vehicle body to move in a manual mode or a following mode;

wherein, in the manual mode, the driving module is pulled or pushed by an external force imposed by a user, so as to drive the vehicle body to move; in the following mode, the target module receives the first signal and sends the first signal back to the control module to generate a movement signal, and the control module controls the driving module according to the movement signal, such that the driving module drives the vehicle body to follow the target device, wherein when the target device moves out of a communication distance of the control module, the control module controls the driving module to stop operation and sends a reminder signal.

With such configuration, the user is able to adjust the movement manner of the vehicle body according to different ground conditions. For example, when the user moves pass a region having greater height difference, the user moves the vehicle body in the manual mode, thus preventing the vehicle body from failing to follow the user due to the electrical power limitation and being separated from the user. Therefore, the issue of the singular movement mode for all ground conditions of conventional movable vehicles is resolved.

Also, when the target device moves out of the communication distance of the vehicle body, a reminder signal is sent out for notifying the user, thus preventing the user from the necessity of turning back for searching the vehicle body.

In an embodiment of the present invention, the control module has a sense unit which generates the first signal. The target module receives the first signal which is further processed, and the processing time thereof is embedded into the first signal to form a second signal, and the target device sends the second signal back to the calculation unit. The calculation unit generates a relative distance between the vehicle body and the target device according to a transmission time, a receiving time, and the processing time based on the first signal and the second signal. The calculation unit determines the relative direction of the vehicle body with respect to the target device according to the variation of the relative distance over time, so as to generate the movement signal. With such configuration, the relative distance is determined between the target device and the vehicle body based on the time variation without any directional limitations, thus allowing the vehicle body to accurately move according to the relative direction with respect to the target device. Therefore, the issue of inaccurate positioning, determination delay, directional limitation, and determination errors caused by signal weakness are resolved.

In an embodiment of the present invention, the control module has an adjustment unit, which adjusts the movement speed of the vehicle body according to the relative distance in the following mode. Therefore, the vehicle body is able to move at an appropriate speed corresponding to the walking speed of the user, so as to keep an appropriate distance with respect to the user, thus preventing the vehicle body to be too closed to the user and cause an oppressing feeling upon the user, and also preventing the vehicle body to be too far away from the user and cause the disconnection between the vehicle body and the target device.

In an embodiment of the present invention, the remote control module has a mode unit, a direction unit, and a speed unit. The mode unit is applied for setting and outputting the switch signal. In the following mode, the direction unit is applied for setting and outputting a direction signal to the control module, and the driving module drives the vehicle body to move according to the direction signal. The speed unit is applied for setting and outputting a speed signal to the control module, and the adjustment unit, according to the speed signal, controls the movement speed at which the driving module drives the vehicle body to move. Therefore, besides the automatic following function provided in the following mode, the vehicle body of the present invention is also allowed to be remotely controlled by the user for achieving the following function.

In an embodiment of the present invention, the vehicle body has a power assistance module which is coupled with the control module and the driving module. The driving module has two motors and two driving wheels that are connected. The control module controls the driving module to drive the vehicle body to move in an assistance mode according to the switch signal. In the assistance mode, the power assistance module is operated by the user to output an operation signal to the control module, and the control module transforms the operation signal to a power signal for adjusting the power output by the two motors, so as to control the rotation speed of the two driving wheels. Therefore, the power assistance module lowers the external force needed to be imposed by the user, allowing the user to easily move the vehicle body.

In an embodiment of the present invention, the control module has an angle unit which is coupled with the adjustment unit. The angle unit is applied for detecting the inclination angle of the vehicle body to generate an angle value. The adjustment unit has an inclination threshold value. When the angle value exceeds the inclination threshold value, the adjustment unit lowers the movement speed at which the driving module drives the vehicle body to move. Therefore, when the vehicle body moves to a region having great height variations, the vehicle body is prevented from toppling due to loss of balance of the gravity center thereof.

DETAILED DESCRIPTION OF THE INVENTION

Figure 1:
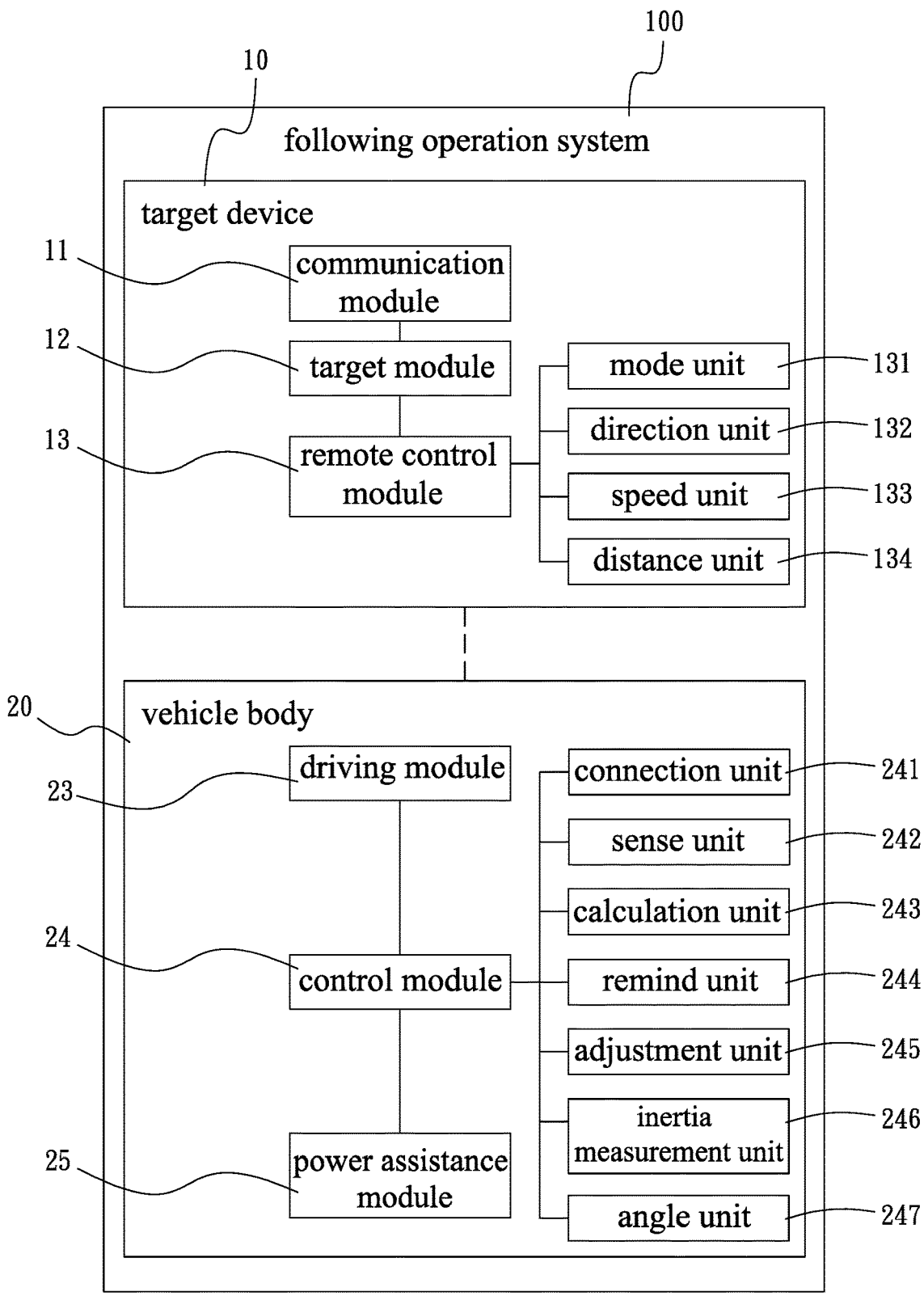
FIG. 1 is a block diagram illustrating the structure of the following operation system in accordance with an embodiment of the present invention.
Figure 2:
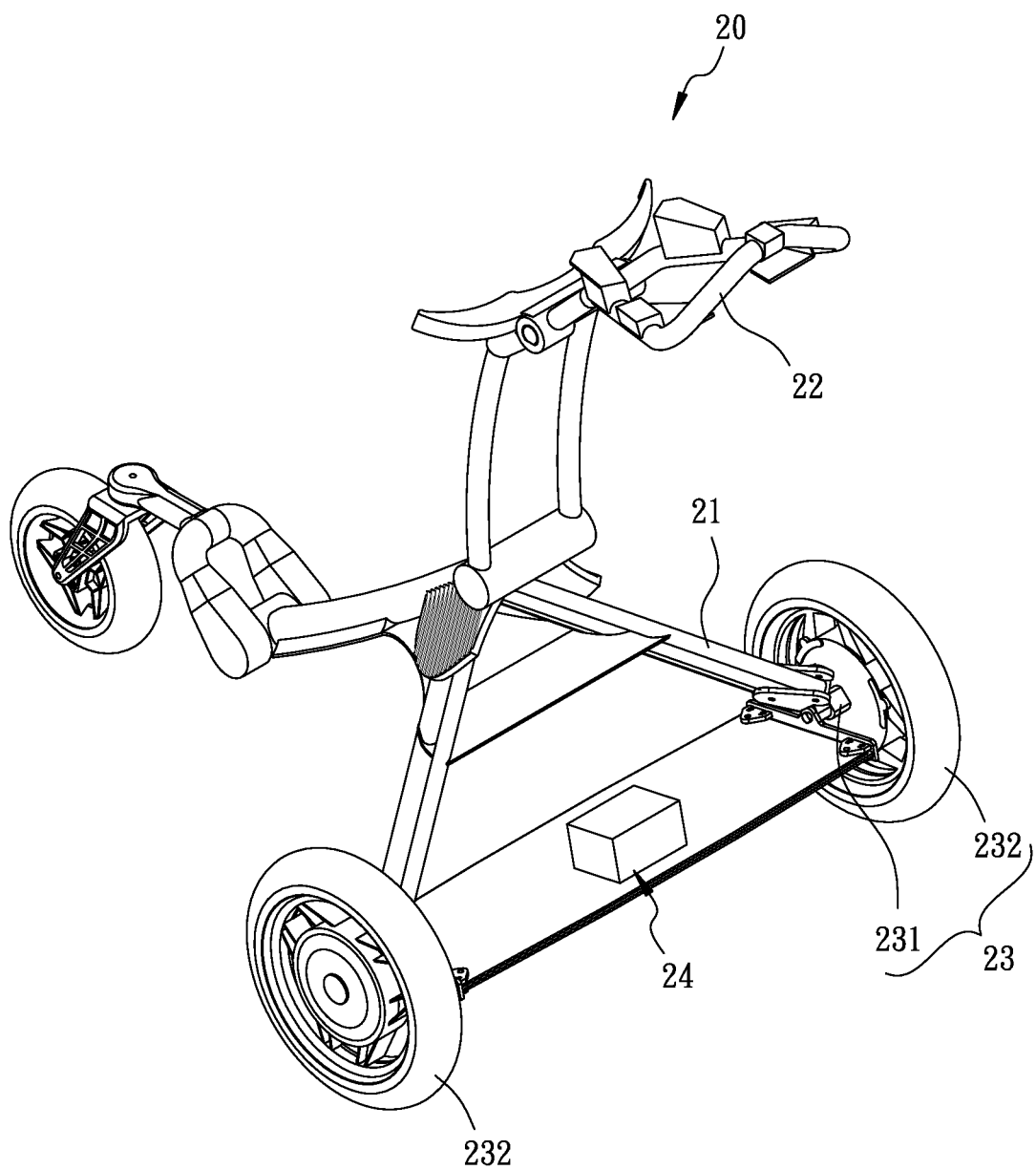
FIG. 2 is a perspective view of the following operation system in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 7, a following operation system 100 in accordance with an embodiment of the present invention comprises a target device 10 and a vehicle body 20 that are connected with wireless signal connection. The target device 10 is worn on the user 1, such that the user 1 is able to set a switch signal through the target device 10. The vehicle body 20 moves in a manual mode or a following mode according to the switch signal. Therein, in the manual mode, the vehicle body 20 is pulled or pushed to move by an external force imposed by the user 1. In the following mode, the vehicle body 20 automatically follows or is remote controlled to follow the user 1. Therefore, the user 1 is able to switch the movement mode of the vehicle body 20 through the switch signal output by the target device 10 for different ground conditions. For example, when the user 1 is to pass a region having great height variations, the user 1 is able to move the vehicle body 20 in a manual mode. When the user 1 is to pass a region without great height difference, the user 1 is able to control the vehicle body 20 to automatically follow in the following mode.

The target device 10 has a communication module 11, a target module 12, and a remote control module 13 that are coupled with a battery, such that the battery provided the electrical power needed in the operation. The target device 10 is connected with the vehicle body 20 through the communication module 11 via a wireless signal connection. The target module 12 is applied for sending the guidance signal. In an embodiment of the present invention, the communication module 11 is a Bluetooth module, and the target module 12 is an ultra-wideband (UWB) element.

The remote control module 13 has a mode unit 131, a direction unit 132, and a speed unit 133. The mode unit 131 is applied for setting and outputting the switch signal. The direction unit 132 is applied for setting and outputting a direction signal for remotely controlling the vehicle body 20 to move according to the direction signal. The speed unit 133 is applied for setting and outputting a speed signal for remotely controlling the movement speed of the vehicle body 20. Also, the remote control module 13 further has a distance unit 134. The distance unit 134 is applied for providing a predetermined distance, such that the vehicle body 20 is able to move a corresponding distance according to the predetermined distance provided by the distance unit 134, the direction signal, and the speed signal. For example, the user 1 sets the predetermined distance as 10 yards through the distance unit 134, and sets the direction signal and the medium speed signal for the movement, then the vehicle body 20 moves forward at the medium speed for a distance of 10 yards.

The vehicle body 20 has a holder 21 and a handgrip 22 that are connected. The holder 21 is applied for placing objects thereon. In an embodiment of the present invention, the holder 21 is applied for placing golf clubs 2 thereon. The handgrip 22 is applied for the user 1 to grip. When the vehicle body 20 is in the manual mode, the user 1 operates the handgrip 22 to impose an external force for moving the vehicle body 20.

The vehicle body 20 has a driving module 23 connected with the holder 21. The driving module 23 has two motors 231 and two driving wheels 232. The two motors 231 are coupled with the power source and further connected with the two driving wheels 232, respectively, while the two driving wheels 232 are disposed on two sides of the holder 21, respectively. The power output from the two motors 231 controls the rotation speed of the two driving wheels 232, wherein the rotation speed of each driving wheel 232 controlled by the respective motor 231 is allowed to be identical or different. In an embodiment of the present invention, the power source is a 24 volt lead-acid battery.

The vehicle body 20 has a control module 24 disposed on the holder 21 and coupled with the driving module 23. The control module 24 has a connection unit 241, which is connected with the communication module 11 of the target device 10 through a wireless signal communication. In an embodiment of the present invention, the connection unit 241 is a Bluetooth module.

The control module 24 further has a sense unit 242 and a calculation unit 243. The sense unit 242 sends out a first signal. In the following mode, the target module 12 receives the first signal and processes the first signal, which is then sent back to the calculation unit 243 to generate a movement signal. The calculation unit 243 controls the driving module 23 according to the movement signal, such that the vehicle body 20 is driven to automatically follow the target device 10 to move. In an embodiment of the present invention, the target module 12 and the sense unit 242 communicate through an ultra-wideband (UWB) communication. Also, in another embodiment, two sense units 242 are provided and disposed on the holder 21 in adjacent to two sides of the two driving wheels 232, respectively (not shown).

Further, the two sense units 242 sends a first signal, respectively; After the target module 12 of the target device 10 receiving the two first signals, the two first signals are then processed and imbedded with the processing time to form a second signal which is then sent back to the calculation unit 243. When the calculation unit 243 receives the second signal, by first subtracting the time of sending the first signal and then subtracting the time of the target module 12 processing the first signal from the time of receiving the second signal, the transmission times of the first signal and the second signal are acquired. By firstly multiplying the transmission time by the light speed, and secondly dividing the summation above by 2, the distances of the two sense units 242 with respect to the target device 10 are acquired, respectively. Because the distance between the two sense units 242 is fixed, a relative distance between the central point of the vehicle body 20 and the target device 10 is calculated through a trigonometric function. Also, the calculation unit 243 determines the direction of the target device 10 with respect to the vehicle body 20, so as to generate the movement signal. Therefore, the vehicle body 20 moves in a correct direction, the relative distance will not increase over time. However, if the vehicle body 20 moves in an incorrect direction, the relative distance will increase over time, which means that the vehicle body 20 move in an opposite direction. Therefore, the calculation unit 243 controls the driving module 23 to drive the vehicle body 20 to turn toward the correct movement direction.

Figure 3:
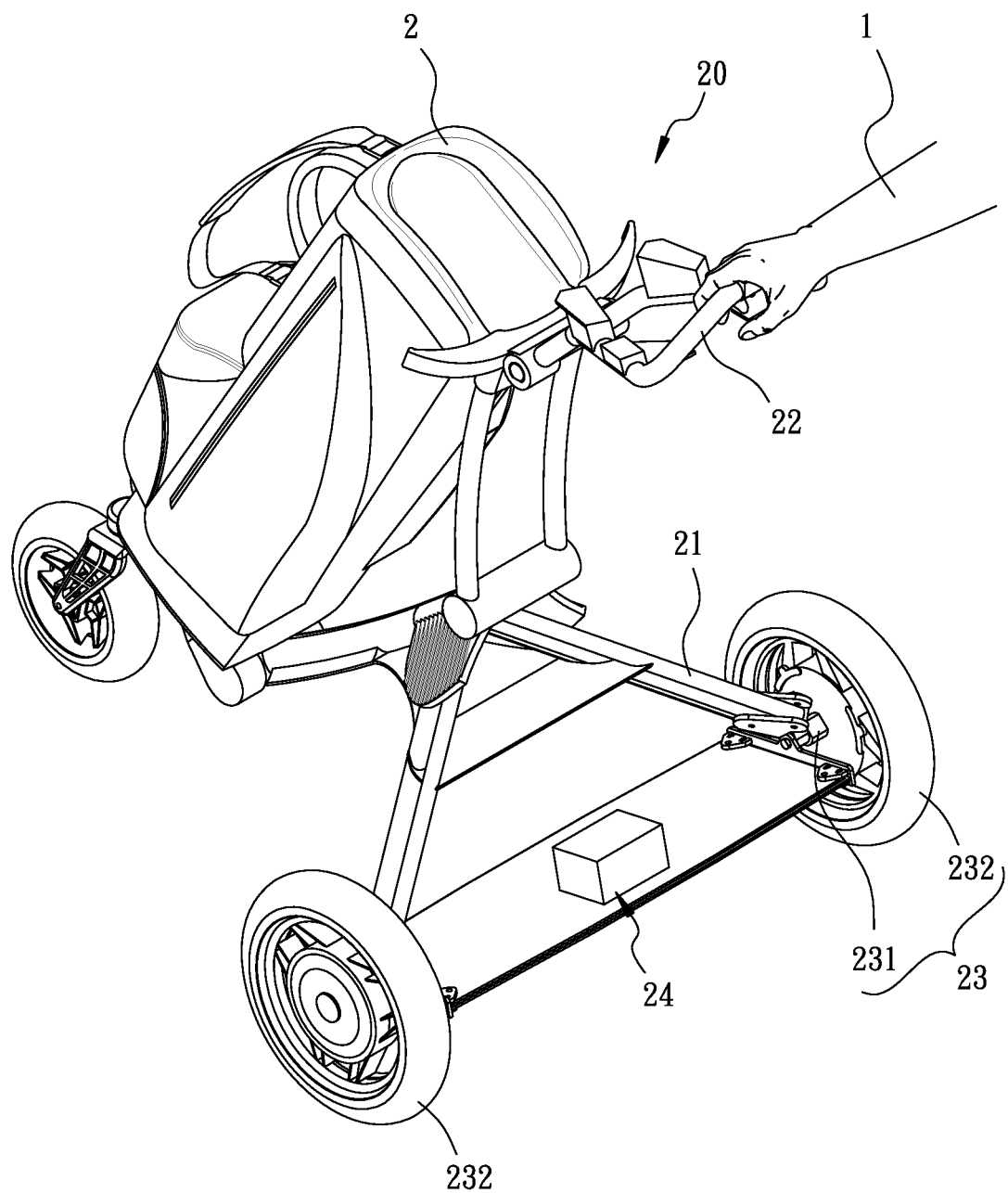
FIG. 3 is a schematic view of the following operation system, illustrating the vehicle body moving in the manual mode.
Figure 4:
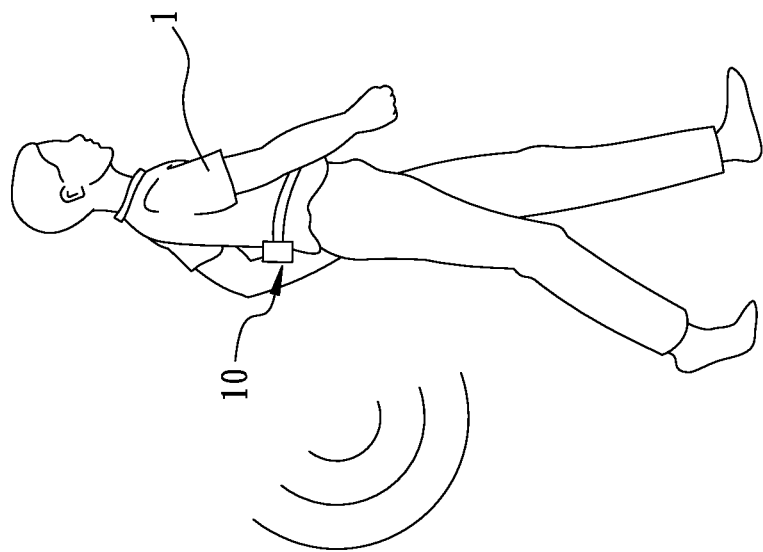
FIG. 4 is a schematic view of the following operation system, illustrating the vehicle body moving in the following mode.
Figure 4:
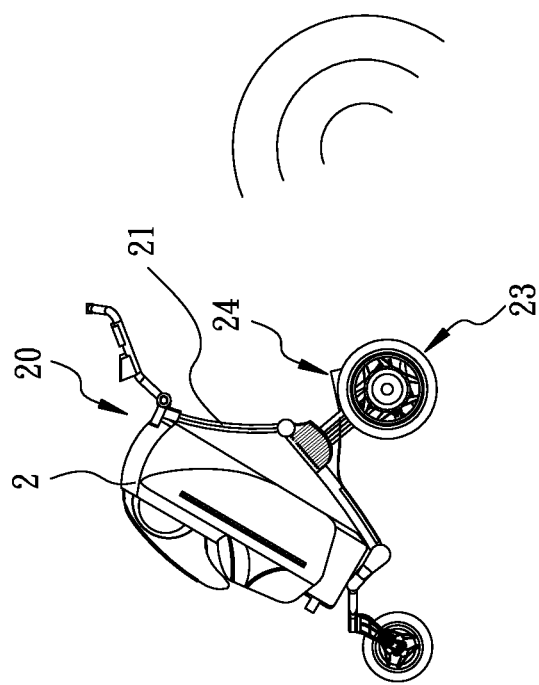
Figure 5:
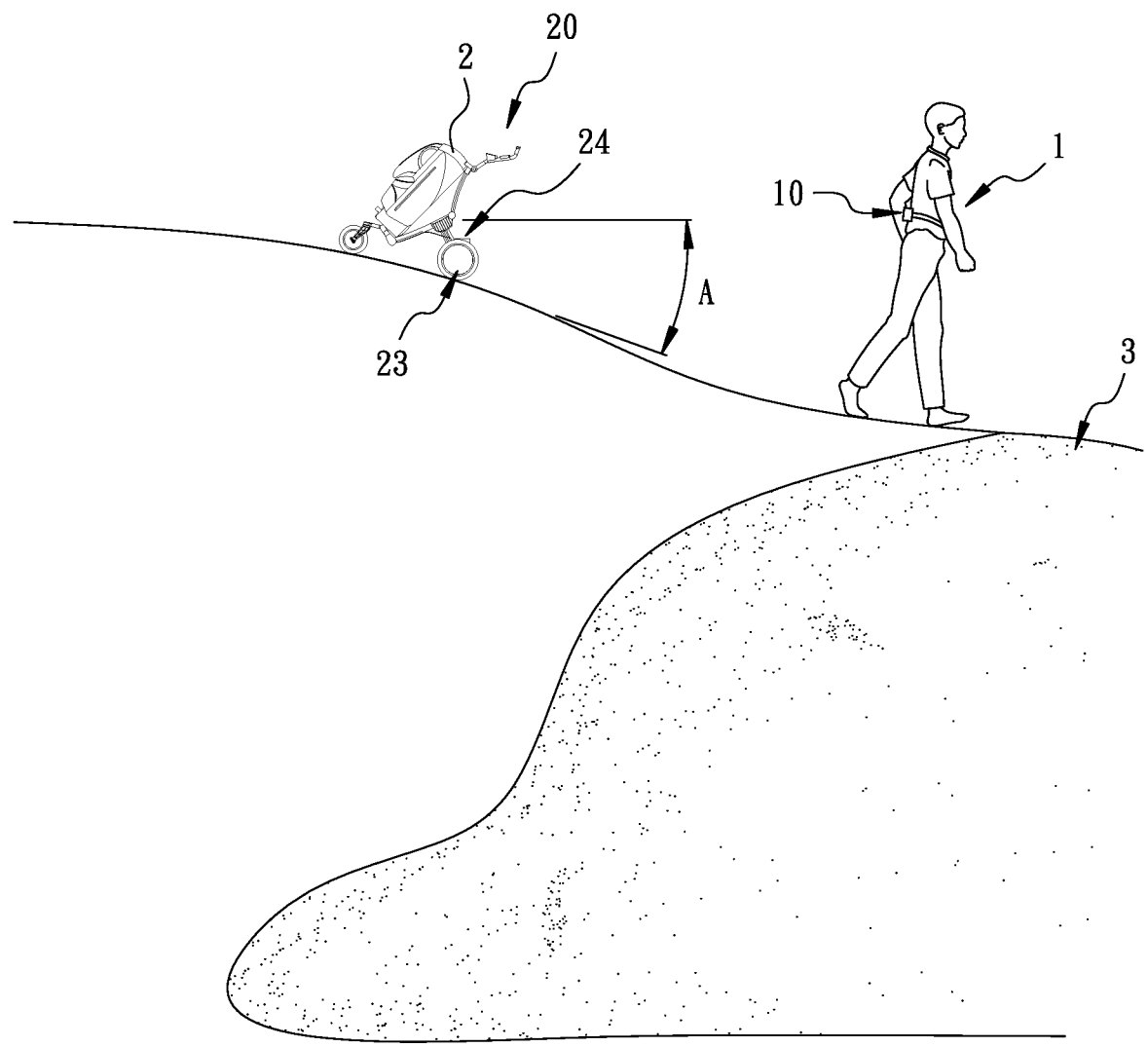
FIG. 5 is a schematic view of the following operation system, illustrating the angle unit detecting the inclination angle of the vehicle body.

Therefore, the control module 24 is able to receive the switch signal via the connection unit 241, and controls the vehicle body 20 to move in the manual mode or the following mode according to the switch signal. In the manual mode, the two driving wheels 232 of the driving module 23 are pulled or pushed by the user 1, whereby the vehicle body 20 moves, as shown by FIG. 3. In the following mode, the control module 24, according to the movement signal acquired by processing the first signal and the second signal, controls the driving module 23 to drive the vehicle body 20 to automatically follow the movement of the user 1 who wears the target device 10, as shown by FIG. 4.

In addition, the control module 24 has a remind unit 244. In the following mode, if the target device 10 leaves the communication distance of the control module 24, the remind unit 244 of the control module 24 operates the driving module 23 to stop the movement of the vehicle body 20 and sends out a reminder signal for notifying the user 1 that the vehicle body 20 is disconnected from the target device 10 and stops following. Therein, the reminder signal sent by the remind unit 244 is allowed to be a sound, light, or a combination thereof.

The control module 24 further has an adjustment unit 245 and an inertia measurement unit 246. The adjustment unit 245 adjusts the movement speed at which the driving module 23 drives the vehicle body 20 to move in the following mode according to the relative distance. The inertia measurement unit 246 is applied for detecting the angular velocity of the vehicle body 20. More specifically, when the vehicle body 20 rotates at an angular velocity, the inertia thereby generated will cause an unexpected angular velocity motion. For preventing the vehicle body 20 from any unexpected angular velocity motion, the adjustment unit 245 includes an angular velocity controlling function. Therein, by use of the angular velocity generated by the inertia measurement unit 246 and carrying out a proportional integrative derivative (PID) control with a feedback of the angular velocity, the adjustment unit 245 calibrates the error between the angular velocity and the rotation speed of the driving module 23 according to the PID control, thereby controlling the movement speed of the vehicle body 20.

The adjustment unit 245 includes a communication distance, a following distance, and a stop distance, wherein the communication distance is larger than the following distance, and the following distance is larger than the stop distance. In an embodiment of the present invention, the communication distance is defined as the distance of the wireless Bluetooth communication between the connection unit 241 and the communication module 11, which is set to twenty meters; the following distance is five meters, and the stop distance is three meters.

When the relative distance is larger than the following distance, the adjustment unit 245 adjusts the movement speed and direction at which the driving module 23 drives the vehicle body 20 to move, wherein the adjustment unit 245 controls the relative distance to remain between the communication distance and the following distance. For example, when the relative distance suddenly decreases, the adjustment unit 245 lowers the rotation speed of the driving module 23 for preventing the vehicle body 20 from moving too close to the user 1, so as to maintain an appropriate distance between the user 1 and the vehicle body 20.

When the relative distance is between the following distance and the stop distance, the adjustment unit 245 adjusts the movement direction in which the driving module 23 drives the vehicle body 20 to move. When the relative distance is smaller than the stop distance, it indicates that the user 1 is to retrieve golf clubs 2 from the vehicle body 20. The sense unit 242 then sends the relative distance back to the adjustment unit 245, so that the adjustment unit 245 controls the driving module 23 to stop the movement of the vehicle body 20. When the relative distance again reaches the following distance, the adjustment unit 245 controls the driving module 23 to accelerate the vehicle body 20 to approach the user 1, so as to keep the vehicle body 20 between the communication distance and the stop distance.

When the relative distance is larger than the communication distance, the connection unit 241 might be disconnected from the communication module 11 due to a poor quality of the connection. Currently, the calculation unit 243 sends the relative distance back to the remind unit 244 and the adjustment unit 245, such that the adjustment unit 245 controls the driving module 23 to stop operating, and the remind unit 244 sends out the reminder signal.

Further, the control module 24 has an angle unit 247 coupled with the adjustment unit 245 for detecting an inclination angle of the vehicle body 20, so as to generate an angle value A. The adjustment unit 245 includes an inclination threshold value. When the adjustment unit 245 receives an angle value A, detected by the angle unit 247, which exceeds the inclination threshold value, the adjustment unit 245 lowers the movement speed at which the driving module 23 drives the vehicle body 20 to move. More specifically, referring to FIG. 1 and FIG. 5, when the vehicle body 20 moves to a ground region of a golf course 3 having a greater height difference, such as a downgrade region shown by FIG. 5, the angle unit 247 detects a variation of the overall inclination angle of the vehicle body 20, and the angle value A exceeds the inclination threshold value. Therefore, the adjustment unit 245 begins to lower the movement speed at which the driving module 23 drives the vehicle body 20 to move, whereby the vehicle body 20 moves at a relatively slower speed, preventing the vehicle body 20 from toppling due to a high-speed movement.

Further, the vehicle body 20 has a power assistance module 25 disposed on the handgrip 22 and coupled with the driving module 23 and the control module 24. Therein, the control module 24 controls the driving module 23 to move the vehicle body 20 in an assistance mode according to the switch signal. In the assistance mode, the power assistance module 25 is operated by the user 1 to output an operation signal to the control module 24, and the control module 24 transforms the operation signal to a power signal for adjusting the power output of the two motors 231, so as to control the rotation speed of the two driving wheels 232 for the driving module 23 to drive the vehicle body 20 to move.

Figure 6:
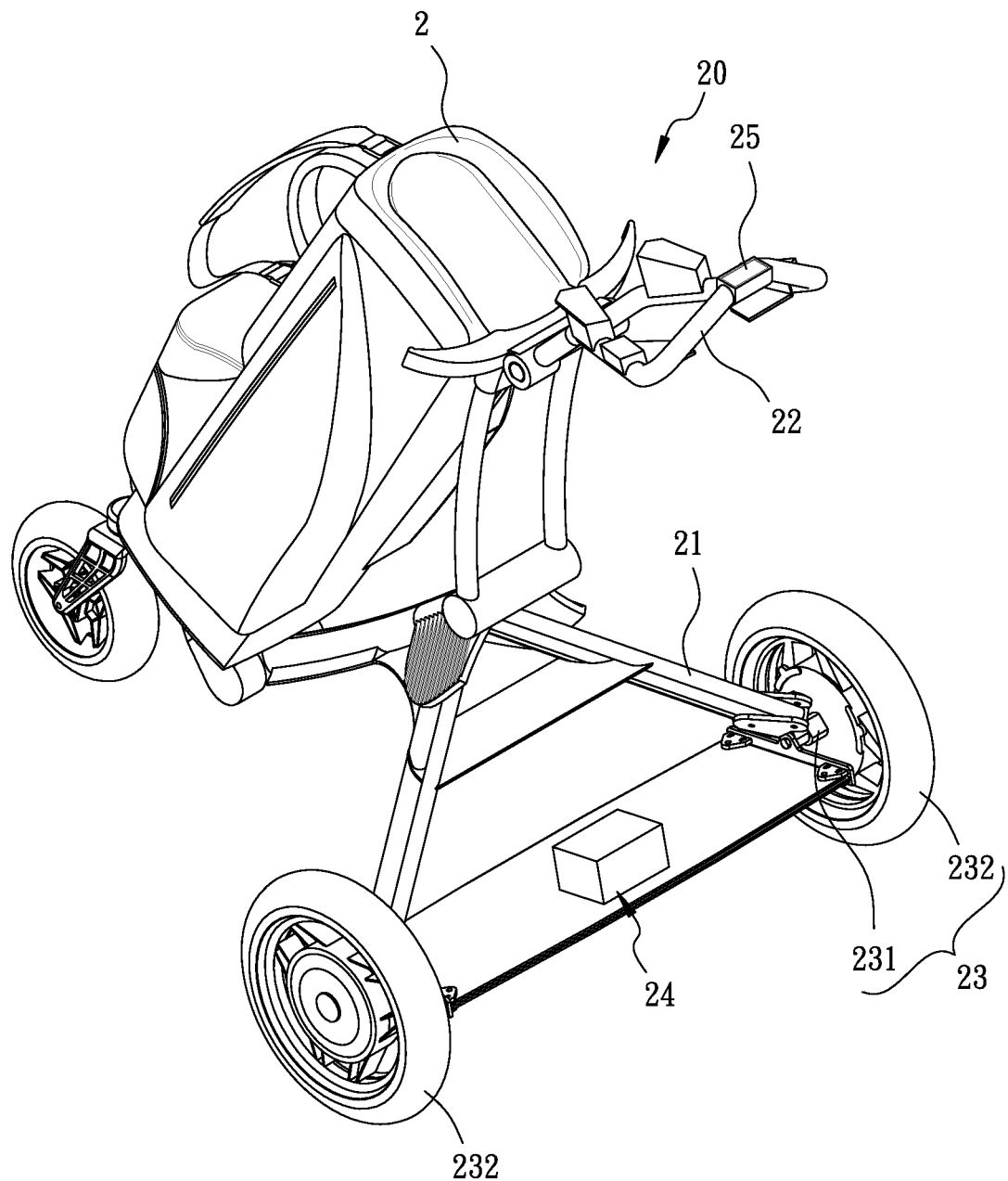
FIG. 6 is a schematic view of the following operation system, illustrating the vehicle body moving in the assistance mode, with the remote control device as the power assistance module.

Referring to FIG. 3 and FIG. 6, the power assistance module 25 is a remote control device, and applied for the user 1 to input the operation signal. In an embodiment of the present invention, the operation signal refers to the direction signal and the speed signal of the target device 10, and the control module 24 transforms the operation signal into the power signal for adjusting the power output of the two motors 231, so as to control the rotation speed of the two driving wheels 232 for the driving module 23 to drive the vehicle body 20 to move.

Figure 7:
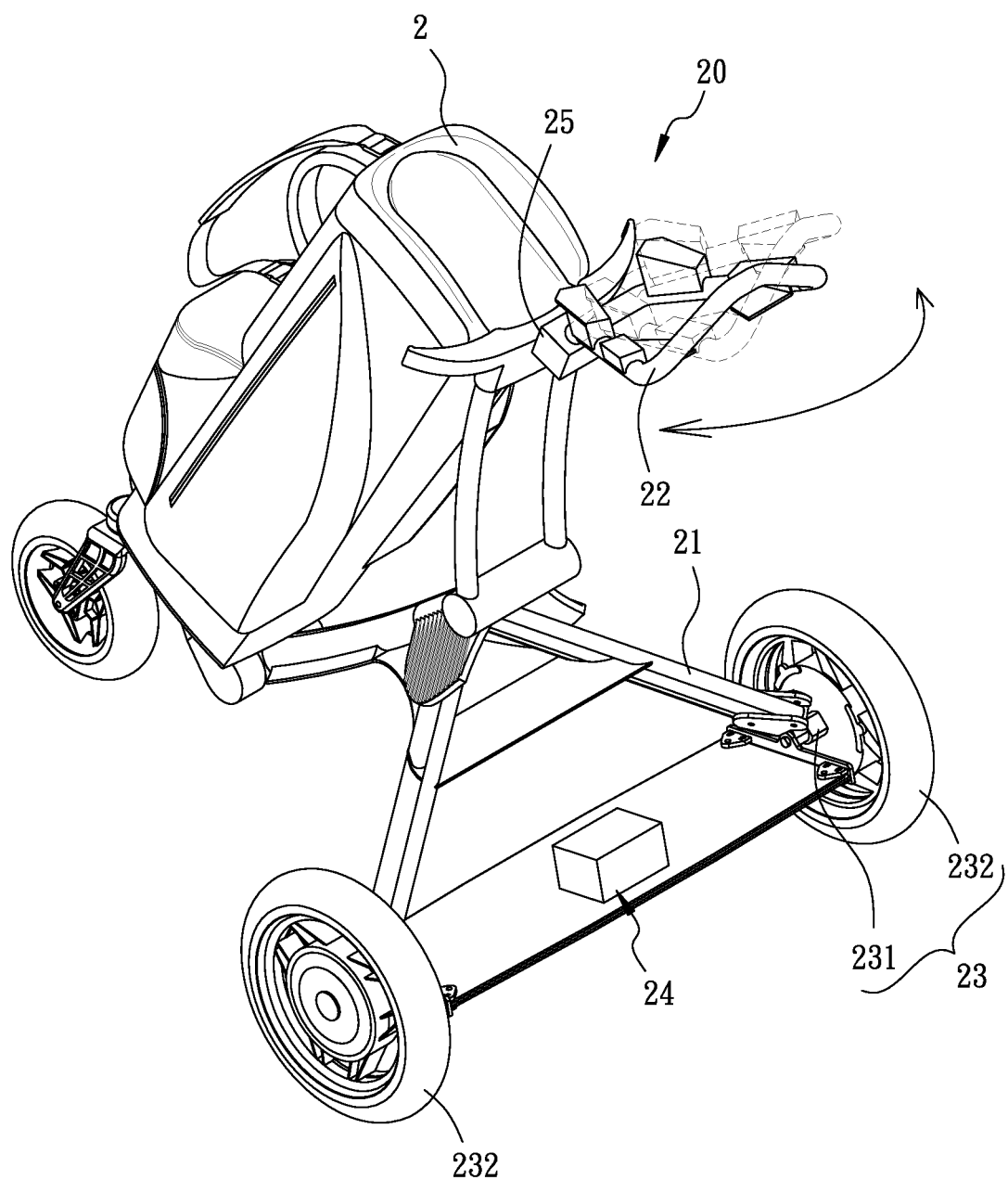
FIG. 7 is a schematic view of the following operation system, illustrating the vehicle body moving in the assistance mode, with the universal connector as the power assistance module.

Referring to FIG. 3 and FIG. 7, the power assistance module 25 is a universal connector, and the movement signal is the external force imposed upon the handgrip 22 by the user 1. In an embodiment of the present invention, the external force imposed by the user 1 is a pulling force. When the user 1 grips the handgrip 22 and pulls the vehicle body 20, the pulling force controls the power assistance module 25 to rotate for generating the corresponding operation signal. Then, the control module 24 transforms the operation signal into the power signal for adjusting the power output of the two motors 231, so as to control the rotation speed of the two driving wheels 232 for the driving module 23 to drive the vehicle body 20 to move.

With the foregoing configuration, the present invention achieves following effects.

Regarding the following operation system 100 of the present invention, the user 1 is able to switch the vehicle body 20 to move in the manual mode, following mode, or assistance mode according to different ground conditions. Therefore, the issue of the singular movement mode for all ground conditions of conventional movable vehicles is resolved. Also, besides the automatic following function, the user 1 is able to remotely control the vehicle body 20 to follow as well.

Upon the vehicle body 20 being disconnected with the target device 10, a reminder signal is immediately sent out for notifying the user 1, so as to prevent the vehicle body 20 from leaving the user 1, facilitating the convenience of usage.

The following operation system 100 is able to detect the distance between the target device 10 and the vehicle body 20 without any directional limitations, and determines the following direction of the vehicle body 20 according to the variation of the distance over the signal transmission time, instead of determining the distance according to the strength of the signal. Therefore, the vehicle body 20 is allowed to move toward the direction of the target device 10.

The adjustment unit 245 keeps the movement speed of the vehicle body 20 according to the walking speed of the user 1, and maintains an appropriate distance between the vehicle body 20 and the user 1, thus preventing an oppressing feeling for occurring, and also preventing the disconnection between the vehicle body 20 and the target device 10.

The angle unit 247 is able to detect the inclination angle of the vehicle body 20. When the vehicle body 20 passes through a region with greater height difference, the adjustment unit 245 lowers the movement speed of the vehicle body 20, so as to maintain the balance of the gravity center thereof, and improve the stability of the vehicle body 20 during movement.

The power assistance module 25 lowers the external force needed to be imposed by the user 1, allowing the user 1 to easily move the vehicle body 20.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A following operation system, comprising:
   a target device having a target module and a remote control module, the remote control module setting and outputting a switch signal; and
   a vehicle body having a holder, a driving module, and a control module, the holder applied for holding objects, the driving module connected with the holder, the control module having a sense unit and a calculating unit, and the control module controlling the vehicle body to move in a manual mode or a following mode; such that in the manual mode, the driving module is pulled or pushed by an external force imposed by a user, so as to drive the vehicle body to move; in the following mode, the sense unit generates a first signal, the target module receives the first signal to process the first signal and add a processing time into the first signal to form a second signal which is then sent back to the calculation unit, the calculation unit generates a relative distance between the vehicle body and the target device according to a transmission time, a receiving time, and the processing time based on the first signal and the second signal; the calculation unit determines a relative direction and distance of the target device with respect to the vehicle body according to a variation of the relative distance over time, so as to generate the movement signal; and the control module controls the driving module according to the movement signal, such that the driving module drives the vehicle body to follow the target device, wherein when the target device moves out of a communication distance of the control module, the control module controls the driving module to stop operation and sends a reminder signal.

2. The system of claim 1, wherein the target device has a communication module having a connection unit, and the communication module is connected to the communication module through a wireless communication; the target device is connected with the sense unit through an ultra-wideband (UWB) communication.

3. The system of claim 2, wherein the control module has an adjustment unit, and the adjustment unit is applied for adjusting a movement speed at which the driving module drives the vehicle body to move in the following mode.

4. The system of claim 3, wherein the adjustment unit stores a following distance and a stop distance, and the following distance is larger than the stop distance; when the relative distance is larger than the following distance, the adjustment unit adjusts the movement speed and a movement direction at which the driving module drives the vehicle body to move according to the variation of the relative distance over time; when the relative distance is between the following distance and the stop distance, the adjustment unit adjusts the movement direction at which the driving module drives the vehicle body to move according to the variation of the relative distance over time; when the relative distance is smaller than the stop distance, the driving module stops the movement of the vehicle body.

5. The system of claim 4, wherein the adjustment unit stores the communication distance which is larger than the following distance; when the relative distance is larger than the communication distance, the driving module stops the movement of the vehicle body and sends out the reminder signal.

6. The system of claim 3, wherein the remote control module has a mode unit, a direction unit, and a speed unit, the mode unit applied for outputting the switch signal; in the following mode, the direction unit is applied for setting and outputting a direction signal to the control module, and the driving module drives the vehicle body to move according to the direction signal; the speed unit is applied for setting and outputting a speed signal to the control module, and the adjustment unit adjusts the movement speed at which the driving module drives the vehicle body to move according to the speed signal.

7. The system of claim 1, wherein the vehicle body has a power assistance module coupled with the control module and the driving module, the driving module having two motors and two driving wheels, the two motors connected with the two driving wheels; the control module, according to the switch signal, controls the driving module to drive the vehicle body to move in an assistance mode; in the assistance mode, the power assistance module is operated by the user to output an operation signal to the control module, so as to control a rotation speed of the two driving wheels.

8. The system of claim 7, wherein the vehicle body has a handgrip connected with the holder, and the a power assistance module is disposed on the handgrip; the power assistance module is selected from a group consisting of a remote control device and a universal connector, and the operation signal is an external force imposed on the handgrip by the user.

9. The system of claim 3, wherein the control module has an angle unit coupled with the adjustment unit for detecting an inclination angle of the vehicle body to generate an angle value, and the adjustment unit stores an inclination threshold value; when the angle value exceeds the inclination threshold value, the adjustment unit lowers the movement speed at which the driving module drives the vehicle body to move.

* * * * *